Figure 1:
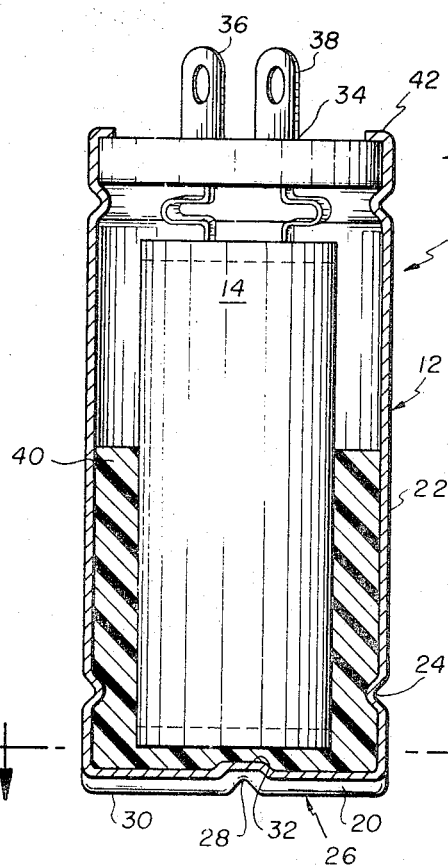

United States Patent

[11] 3,551,756

| | | |
|---|---|---|
| [72] | Inventor | Eugene F. Frekko<br>Sanford, N.C. |
| [21] | Appl. No. | 773,794 |
| [22] | Filed | Nov. 6, 1968 |
| [45] | Patented | Dec. 29, 1970 |
| [73] | Assignee | Cornell-Dubilier Electric Corporation<br>Newark, N.J.<br>a corporation of Delaware |

[54] ELECTROLYTIC CAPACITORS WITH MECHANICALLY STABILIZED ELECTRODE ASSEMBLY
11 Claims, 6 Drawing Figs.

[52] U.S. Cl. .................................... 317/230,
 317/242
[51] Int. Cl. ........................................ H01g 9/06
[50] Field of Search............................ 317/230,
 231, 232, 233

[56] References Cited
UNITED STATES PATENTS

| 2,129,089 | 9/1938 | Hood............................ | 317/230 |
| 2,234,042 | 3/1941 | Deeley.......................... | 317/230 |
| 3,243,668 | 3/1966 | Diggens........................ | 317/230 |
| 3,301,270 | 1/1967 | Harn............................. | 317/230 |

*Primary Examiner*—James D. Kallam
*Attorney*—Paul S. Martin and Richard M. Rabkin ABSTRACT: An electrolytic capacitor having an electrode winding impregnated with electrolyte is contained in an envelope and held in position and against rotation in the envelope by a potting mass. The envelope has ribs and grooves that interlock with the potting material so there is no dependence on adhesion between the potting mass and the envelope. The impregnant contains a solvent, e.g. dimethylformamide, and the potting mass is a material that resists the solvent, e.g. polypropylene, polyethylene, and epoxy resins.

PATENTED DEC 29 1970　　　　　　　　　　　　　　　　　3,551,756

INVENTOR
EUGENE F. FREKKO

BY Richard M. Rabkin

ATTORNEY

ELECTROLYTIC CAPACITORS WITH MECHANICALLY STABILIZED ELECTRODE ASSEMBLY

This invention relates to electrolytic capacitors and more particularly to the securing of electrolytic capacitor sections in the capacitor envelope so as to secure the section from longitudinal or rotational movement.

Electrolytic capacitors are used in mobile electronic equipment and because of their use in this environment they are subject to deleterious shock and vibration. With increased emphasis on the miniaturization of electronic equipment, the components have been crowded together. This crowding causes the temperature of the components to rise and, in many instances, unless they are designed for higher-than-normal temperature operation their useful life is diminished. The electrolytic capacitors generally comprise a capacitor section which is mounted within an envelope. Connections in the form of thin foils or fragile rods extend from the section to a header which seals the envelope. Unless the section is securely held the vibration and shock will break the connections causing failure of the capacitor. Many capacitors have been and still are produced in which the capacitor section is secured within the envelope by insulating materials having relatively low melting points such as the well-known pitch. Although the use of pitch or other asphaltic materials have proven to be satisfactory in standard capacitors used in "non-difficult" environments, where the capacitor must withstand temperatures close to the melting point of the pitch, such materials are no longer satisfactory. Further, it has been found that constituents of the electrolyte attacked or softened the pitch at normal environmental temperatures. The problem is increased by the materials and solvents used in electrolytes which are capable of withstanding elevated temperatures. This is particularly true of that class of electrolytes which includes dimethylformamide (D.M.F.) as a constituent.

Alternate methods for securing the section within the envelope have been suggested by the prior art including the use of various spring configurations for immobilizing the capacitor body. These have the disadvantage of cost, complexity and, where metallic springs were used, conductivity. In addition, the use of new substances such as plastics have been suggested. Where less than complete filling of the space around the section has been attempted the results have been generally unsatisfactory due to lack of adhesion of the fill material and the capacitor envelope. This lack of adhesion is accentuated by thermal cycling of the capacitor which causes separation of the envelope and the filler due to their different coefficients of expansion. An object of the present invention is to provide an improved capacitor having a relatively immobilized capacitor section.

Another object of the invention is to provide a novel method for utilizing nonwetting materials for capacitor section immobilization. Still another object of this invention is to provide a capacitor having reduced dislocation of the capacitor section due to vibration and shock.

A further object of the invention is the provision of an improved capacitor having improved temperature cycling characteristics.

Still another object of the invention is to provide an improved method for potting a capacitor which overcomes the disadvantages of the prior art noted above.

Yet another object of the invention is to reliably fix a capacitor section in place within its envelope without applying clamping force thereto.

The above and other objects and advantages are accomplished in the illustrative capacitor described below as an embodiment of the invention in its various aspects. Briefly, there is provided an electrolytic capacitor which includes a capacitor section impregnated with a solvent-containing electrolyte and an envelope therefor. The section is provided with terminal connections. The capacitor envelope which encloses the section has walls and an open end. The envelope length and cross-sectional area are greater than that of the section so as to provide a space between the section and the walls of the envelope. A header of insulation seals the open end of the envelope and has a terminal member which extends therethrough. The terminal member is connected to one of the section terminals. A retainer formation is provided in the envelope wall adjacent the section. A mass of solvent-resistant potting material partially fills the space between the envelope and the section and adheres to the section but is substantially nonadherent to the envelope. The mass engages the retainer formation so that deleterious movement of the section relative to the envelope is inhibited.

Figure 2:
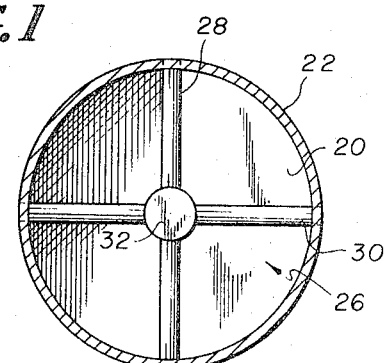
Figure 3:
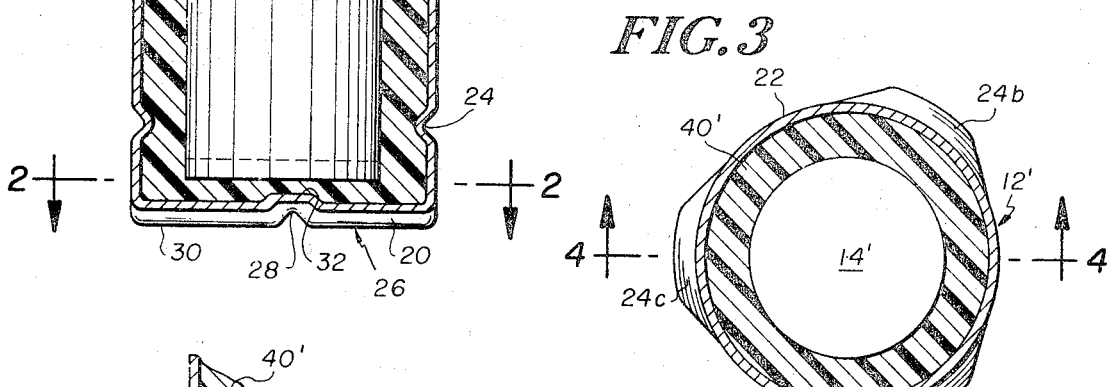
Figure 4:
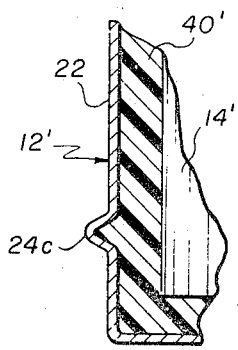
Figure 5:
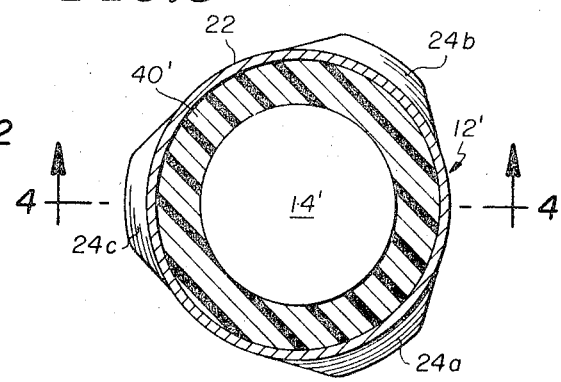
Figure 6:
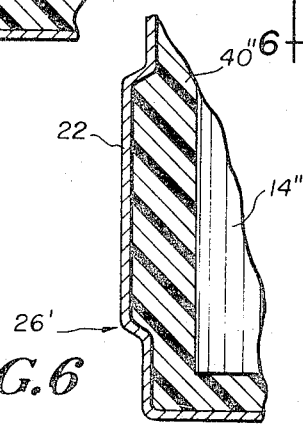

The nature of the invention in its various aspects, further objects and features of novelty will be better appreciated from the illustrative embodiment below in which reference is made to the accompanying drawings. In those drawings:

FIG. 1 is a sectional view of the assembled capacitor;
FIG. 2 is a plan view along the line 2–2 of FIG. 1;
FIG. 3 is a fragmentary plan view of another embodiment of the invention;
FIG. 4 is a fragmentary view in elevation of the embodiment of FIG. 3 as viewed along the line 4–4 of FIG. 3;
FIG. 5 is a fragmentary plan view of still another embodiment of the invention; and
FIG. 6 is a fragmentary view in elevation of the embodiment of FIG. 5 as viewed along the line 6–6 of FIG. 5.

Referring to the drawings, the capacitor 10 includes an envelope 12 in which is mounted capacitor section 14. Capacitor section 14 is a convolutely wound arrangement of a pair of film-forming metallic electrodes, such as aluminum, and interposed porous spacers (not shown) of paper. The envelope length and cross-sectional area are greater than that of the section 14 so as to provide a space between the section and the walls of the envelope. In the illustrated capacitor connection is made to the electrodes by risers 16 and 18 of properly treated aluminum. In order to prevent movement of the section 14 relative to the envelope, potting compound 40 is used in the space between the outer layer of the section, which may be paper or etched aluminum, and the adjacent walls of the envelope. It has been found that many of the most desirable potting compounds, i.e. those that have the ability to withstand the solvent of the impregnant and the operating temperature (up to 105° C.) of the capacitor, do not have the property of "wetting" the wall of the envelope. Without wetting little or no adhesion originally exists between the potting compound, which adheres to the section, and the envelope. Further, many appropriate materials such as polyethylene shrink upon cooling which increases their grasp of the section but pulls the mass 40 away from the wall. As a result of the lack of adhesion, the section is not anchored to the envelope. It is to this problem that one aspect of the present invention is directed. Electrolytic capacitors must be able to withstand multiple temperature cycles from −55° C. to 105° C. which temperature cycles cause further separation of the potting compound and envelope due, in part, to the wide difference in their thermal coefficients of expansion. In order to allow use of otherwise desirable materials the illustrative embodiments of the invention employ retainer formations that are provided to interlock the envelope and the potting compound. Referring to FIG. 1, envelope 12, of aluminum, is cylindrical and has a bottom wall 20 and a side wall 22 in which a first retainer 24 in the form of a continuous peripheral groove is formed. A second retainer 26 which includes a pair of ribs 28, 30 that intersect at a hub 32 is formed in the bottom wall 20 of the container. A single rib may also be employed with somewhat less retention. The open end of the container 12 is sealed by a conventional multipart header 34, of insulation, through which terminal lugs 36, 38 extend for connection to the risers 16 and 18 respectively. Potting compound 40 surrounds the section 14 and engages the retainers 24, 26. The first retainer 24 interengages with the potting compound 40 to inhibit movement of the section along its longitudinal axis. The second retainer 26 inhibits rotational movement of the section about the axis. After impregnation the wall 12 is crimped or spun over at 42 to mechanically secure the seal or header 34.

In producing a capacitor according to one aspect of the invention the risers 16 and 18 of a convolutely wound capacitor section 14 are first connected to the terminals 36, 38 of a header 34. The section is formed according to well-known methods which do not form part of the present invention and which, therefore, will not be described in detail. The potting compound 40 is introduced into the envelope 12 as a measured amount of low density polyethylene beads. Alternatively, selected epoxy resins or polypropylene may be used. Such compounds can be metered into the envelope in liquid form either at room temperature or at an elevated temperature. The envelope is then heated on a hot plate to a temperature of approximately 180° C. to fluidize the polyethylene beads. Section 14 is then inserted into the envelope and pressed into the heated polyethylene causing it to rise approximately half way up the side wall of the envelope and to pass and surround the retainer formations. The molten polyethylene also enters the mandrel hole or bore of the wound section. Risers 16, 18 are long enough to allow the header 34 to be shifted to one side so that direct force, as by hand, may be applied to the section. The section 14 and envelope 12 are then allowed to cool so that the polyethylene mass 40 hardens. Polyethylene wets the outside porous paper layers of the section 14 but has been found not to wet the aluminum surface of the envelope to any great extent. As previously noted the polyethylene shrinks upon cooling.

The assembled section and envelope is next placed into a standard impregnation system. At this time the header 34 is still tipped to one side so that free passage is provided to the interior of the section for the impregnating fluid which contains dimethylformamide as a solvent. The capacitor is subjected to a heating and vacuum cycle and immersed in the impregnant so that the impregnant fully disperses within the unit. The capacitors are then cooled and cured by conventional means. After cooling the capacitor is inverted and excess impregnant is removed from the envelope. The capacitor is then sealed by crimping in the wall at 42. Some excess impregnant remains in contact with the potting compound 40 which, but for the choice of potting compound, could prove deleterious. Additional impregnant may be exuded from the section during operation but it is of no consequence.

Referring to FIGS. 3 and 4 an alternate form of movement inhibiting retainer 24 is shown. The retainer of FIG. 3 is formed of discontinuous groove having three sections 24a, 24b, 24c. It will be noted that in contrast to the retainer 24 of FIG. 1 the grooves in the case of FIG. 3 are formed as outward bulges in the container. Both forms have in common the interlocking of the envelope wall and the hardened mass 40' of polyethylene. A "keying" relationship is established with the hardened-in-place mass of polyethylene by the flowing of the polyethylene into or around the distorted wall portions of the envelope. The retainer 24 a, 24b, 24c of FIGS. 3 and 4 prevents both longitudinal and rotational movement of the section 14' relative to the envelope 12'.

Referring to FIGS. 5 and 6 still another form of movement inhibiting retainer 28 is shown. In this case a longitudinal rib 28a is formed which is bulged outwardly from the surface of the container 12''. It will be recognized that again the keying effect is called into play between the polyethylene mass 40'' and the envelope 12''. In the embodiments of FIGS. 5 and 6 rotation of the section 14'' and movement along the longitudinal axis is prevented by the longitudinally extending rib 28a.

It will be recognized by those skilled in the art that various combinations and permutations of the rotational and longitudinal retainers described above may be employed together or separately and the retainer forms may be reversed from those shown.

While several embodiments of the invention have been shown and described in detail it will be recognized by those skilled in the art that other materials such as phenolic molding compounds may be used for forming the envelope 12 and utilized with potting compounds that do not wet such envelope materials but which do wet the section materials. In those instances similar structures to those shown and described in detail to provide a keying relationship between the potting compound, that adheres to the section but not to the envelope, and the envelope may be employed. It will be apparent to those skilled in the art that various changes and modifications may be made therein without departing from the spirit and scope of the invention.

I claim:

1. An electrolytic capacitor including a capacitor section having terminal connections extending therefrom, an envelope enclosing said capacitor section, said envelope having walls and an open end, said envelope having greater length and cross-sectional area than said capacitor section providing a space between said capacitor section and said walls of said envelope, a header of insulation sealing the open end of said envelope with a terminal member extending therethrough and connected to one of said section terminals, a retainer formation in said envelope, a solvent-containing electrolyte impregnating said section, a mass of solvent-containing electrolyte impregnating said section, a mass of solvent-resistant potting material partially filling said space between said envelope and said section, said potting mass adhering to said section and being substantially nonadherent to said envelope, said potting mass being in engagement with said retainer and said section for limiting movement of said section relative to said envelope.

2. An electrolytic capacitor according to claim 1 wherein said capacitor section is in the form of a convolutely wound roll of electrodes and insulating spacers and wherein said wound section has a longitudinal axis which is substantially coaxial with the longitudinal axis of said envelope, and wherein said retainer is a discontinuous groove formed in said envelope wall, said groove extending transverse said axis, said potting mass cooperating with said groove and said section and said envelope to restrain movement of said section in said envelope.

3. An electrolytic capacitor according to claim 2 wherein said retainer is a longitudinally extending rib formed in said envelope wall.

4. An electrolytic capacitor according to claim 2 wherein said retainer is a continuous groove formed in said envelope wall, said potting mass restraining movement of said section longitudinally of said envelope.

5. An electrolytic capacitor according to claim 1 wherein said capacitor section is cylindrical and has a longitudinal axis which is substantially coaxial with the longitudinal axis of said envelope and wherein first and second retainer formations are provided in said envelope, said first retainer cooperates with said potting mass for limiting movement of said section longitudinally of said envelope and said second retainer cooperates with said potting mass for limiting rotational movement of said section about said axis.

6. An electrolytic capacitor according to claim 5 wherein said envelope has a closed end wall and said second retainer is formed therein, said potting mass cooperating with said first retainer in said wall for limiting movement of said section longitudinally of said envelope and said potting mass cooperating with said second retainer in said end wall for limiting rotational movement of said section about said axis.

7. An electrolytic capacitor according to claim 6 wherein said second retainer is in the form of a transversely extending rib.

8. An electrolytic capacitor according to claim 5 wherein said first retainer is a groove in one wall and said second retainer is a rib in a second wall of said envelope.

9. An electrolytic capacitor according to claim 1 wherein said solvent-resistant potting material is selected from the group including polypropylene, polyethylene and epoxy resins, and wherein said solvent contained in said electrolyte is dimethylformamide.

10. An electrolytic capacitor according to claim 2 wherein said solvent is dimethylformamide, and wherein said mass is low density polyethylene hardened-in-place.

11. An electrolytic capacitor according to claim 6 wherein said second retainer is in the form of a pair of transverse ribs.